US005202936A

United States Patent [19]

Kobiyama

[11] Patent Number: 5,202,936

[45] Date of Patent: Apr. 13, 1993

[54] METHOD FOR GENERATING A GRAY-SCALE PATTERN

[75] Inventor: Yoshitaka Kobiyama, Fujisawa, Japan

[73] Assignee: International Business Machines Corporation, Armonk, N.Y.

[21] Appl. No.: 734,655

[22] Filed: Jul. 23, 1991

[30] Foreign Application Priority Data

Jul. 25, 1990 [JP] Japan .................................. 2-195101

[51] Int. Cl.[5] .................................... G06K 9/36

[52] U.S. Cl. .................................... 382/54; 382/18; 382/47; 382/51

[58] Field of Search ...................... 382/18, 50, 51, 54, 382/47; 340/728, 731

[56] References Cited

U.S. PATENT DOCUMENTS 4,490,851 12/1984 Gerhart et al. ........................ 382/18
4,688,088 8/1987 Hamazaki et al. .................... 382/18
4,829,587 5/1989 Glazer et al. .......................... 382/47

*Primary Examiner*—David K. Moore
*Assistant Examiner*—Barry Stellrecht
*Attorney, Agent, or Firm*—William A. Kinnaman, Jr.

[57] ABSTRACT

A method for generating a low-resolution gray-scale pattern representing a high-resolution original character image. A sampling pattern is generated having plural sampling windows arranged in columns and rows, the number of columns and rows being determined by the resolution of the gray-scale pattern. The sampling pattern is sequentially positioned at plural positions separated by a predetermined distance along a column direction and a row direction on the original character image to count, at each position, the total number of black pels in predetermined portions of the rows of the sampling pattern and the total number of black pels in predetermined portions of the columns of the sampling pattern. The total number of black pels counted at each of the positions is compared to detect a position at which the largest total number of black pels in the column is detected and at which the largest total number of black pels in the row portions is detected. The sampling window is positioned at the detected position on the original character image, and the number of black pels in each sampling window of the sampling pattern is counted to assign a gray-scale value to the sampling window. Characters such as kanji characters consisting primarily of horizontal and vertical strokes are further processed by shifting selected rows and columns to match the sampling pattern.

9 Claims, 11 Drawing Sheets

METHOD FOR GENERATING A GRAY-SCALE PATTERN

BACKGROUND OF THE INVENTION

1. Field of the Invention

The invention relates to a method for generating a low-resolution gray-scale pattern representing a high-resolution original character image.

2. Description of the Related Art

Bilevel representation, or on/off representation, has been used in cathode ray tube display devices, plasma display devices, liquid crystal display devices and various printers to display or print dot matrix patterns of characters. In the bilevel representation, a binary value is assigned to each picture element (pel). Thus, each pel in the matrix represents black (i.e., foreground) or white (i.e., background). However, the bilevel representation in the matrix produces a stair-step appearance along non-vertical and non-horizontal lines. As the resolution of a displayed or printed image decreases, the stepped edges become larger and increasingly displeasing to the viewer.

Display systems utilizing a plurality of gray-scale levels have been developed to provide a more natural display of character. An article "The Display of Characters Using Gray Level Sampling Arrays", John E. Warnock, *Communications of the ACM*, Vol. 14, No. 3, 1980, pp. 302-307, and U.S. Pat. No. 4,158,200, Charles L. Seitz et al., Burroughs Corporation, disclose the above system utilizing a plurality of different gray-scale levels or levels of luminance.

FIG. 7 shows the concept of a display utilizing different gray-scale levels. A character pattern of a high resolution, such as 88×88 dots/character box, is stored in a font memory. It is assumed that the character pattern is displayed on a display device of a resolution of 11×11 dots/character. In this case, a sampling pattern 21 having 8×8 sampling windows is used. To convert the original character pattern of 88×88 dots to the character image of 8×8 dots, the number of black pels of a portion of the original character image surrounded by one sampling window is counted, and one of eight levels of gray-scale is assigned in accordance with the number of black pels within the sampling window, so that a gray scale pattern 29 is generated. It is used to control the levels of luminance of the display device.

Although a display utilizing gray-scale levels solves the stepped edge problem, it raises a new problem when a relatively complicated character, such as a kanji character including many horizontal and vertical lines, is displayed. Referring to FIG. 14, a kanji character 51 of high-resolution stored in a front memory is shown. In this case a sampling pattern having 16×16 sampling windows is used. In the manner shown in FIG. 7, a gray scale value is assigned to the number of black pels counted in each sampling window to generate a gray scale pattern 52 representing the original kanji character 51. And, the gray scale pattern 52 is supplied to the display device. It is apparent that a displayed pattern using the gray-scale pattern 52 indicates poor quality, includes horizontal lines contacting each other of the same gray levels and indicates inferior readability.

SUMMARY OF THE INVENTION

The invention contemplates a method for generating a low-resolution gray-scale pattern representing a high-resolution original character image. In accordance with the invention, a sampling pattern is generated having plural sampling windows arranged in columns and rows, the number of columns and rows being determined by the resolution of the gray-scale pattern. The sampling pattern is sequentially positioned at plural positions separated by a predetermined distance along a column direction on the original character image to count, at each position, the total number of black pels in predetermined portions of the rows of the sampling pattern. The total number of black pels counted in each of the positions is compared to detect a position at which the largest number of black pels is detected. The sampling pattern is positioned at the detected position on the original character image, and the number of black pels in each sampling window of sampling pattern is counted to assign a gray-scale value to the sampling window.

Preferably the sampling pattern is sequentially positioned at plural positions separated by a predetermined distance along a column direction and a row direction on the original character image to count, at each position, the total number of black pels in predetermined portions of the rows of the sampling pattern and the total number of black pels in predetermined portions of the columns of the sampling pattern. The total number of black pels counted at each position is compared to detect a position at which the largest total number of black pels in the column portions is detected and at which the largest total number of black pels in the row portions is detected.

In a further preferred form of the invention, after positioning the sampling window at the detected position on the original character pattern, the number of black pels in each row and column of the sampling pattern is counted, and the number of black pels in each row is compared to select a row having a larger number of black pels than adjacent rows, while the number of black pels in each column is similarly compared to select a column having a larger number of black pels than adjacent columns. The selected row and column are sequentially positioned at plural positions separated by a predetermined distance along the column direction and the row direction, respectively, on the original character image to count the number of black pels in the row and the number of black pels in the column at each position.

The number of black pels in the selected row at each position is compared to detect a position in a column direction at which the largest number of black pels is detected; likewise, the number of black pels in the selected column at each position is compared to detect a position in a row direction at which the largest number of black pels is detected. The positions of the selected row and column are shifted to the detected positions, and the number of black pels in each sampling window of the sampling pattern counted to assign a gray-scale value to the sampling window.

Preferably, a group of pel lines located at a center portion of the sampling window is used to count the number of black pels in the row or column and the sampling pattern sequentially positioned at plural positions separated by one pel line.

DESCRIPTION OF THE PREFERRED EMBODIMENT

Figure 1:
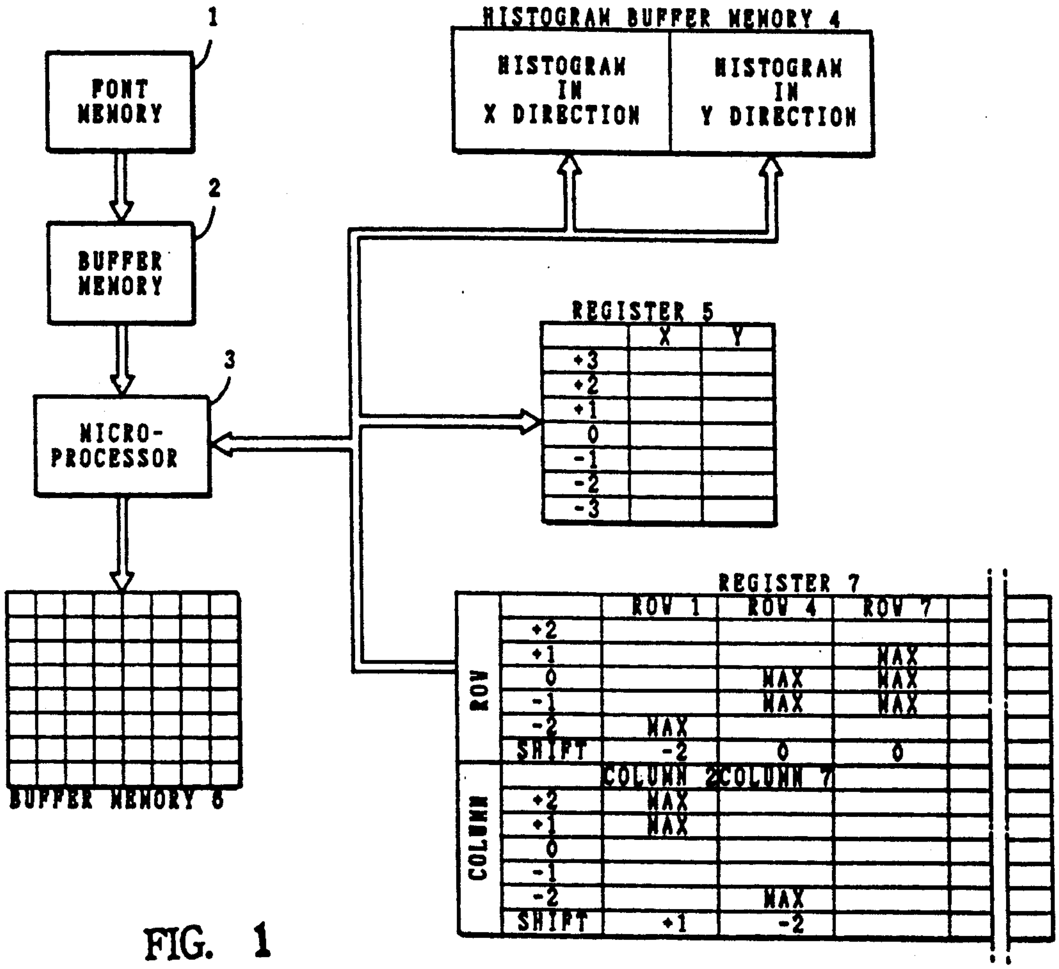
FIG. 1 is a block diagram of a system for performing the operation in accordance with the present invention.

Referring to FIG. 1, a block diagram of a pattern generating system operating in accordance with the present invention is shown.

A font memory 1 stores a set of original character images or patterns of high resolution. It is assumed that the resolution of the original character image is 88×88 dots per character box, and that the original character image is converted to a gray-scale pattern of 8×8 dots or pels per character box.

The pattern generating system can be incorporated in a printer or a display apparatus, and the original character patterns are loaded from a processor into font memory 1.

Figure 2:
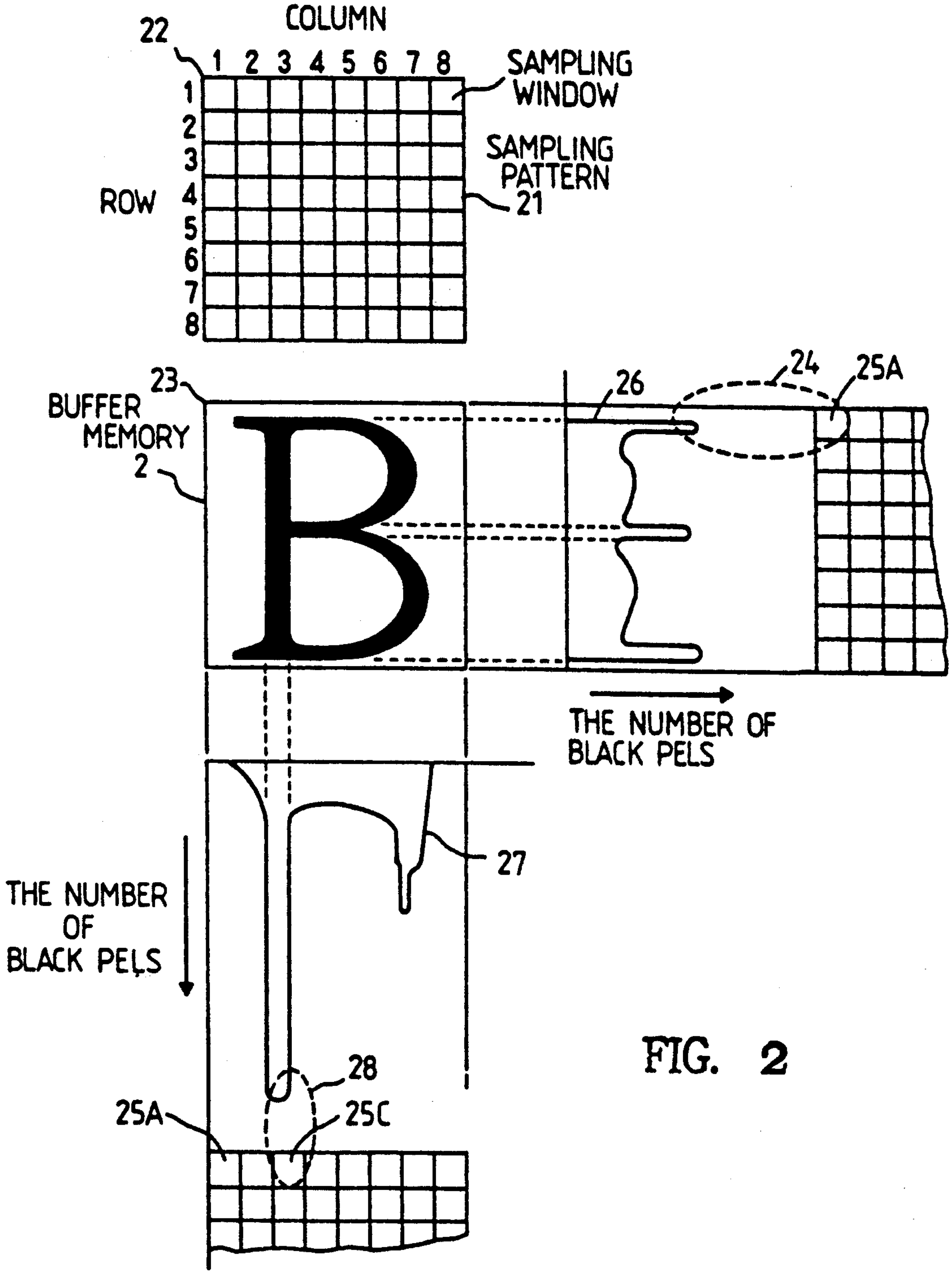
FIG. 2 shows the original character image stored in the buffer memory.

One of the original character patterns, such as an image of the character B, of 88×88 dots resolution is fetched from font memory 1 and loaded into a buffer memory 2 under the control of a microprocessor 3, as shown in FIG. 2.

The size of the buffer memory 2 shown in FIG. 1 is that of one original character box.

Microprocessor 3 generates a grid-like sampling pattern 21 of 8×8 windows, as shown in FIG. 2, based upon the resolution of the original character pattern, i.e. 88×88 dots, and the resolution of the gray-scale pattern, i.e. 8×8 dots, to be displayed on a display screen. The size of the sampling pattern 21 is equal to the size of one character box.

Figure 3:
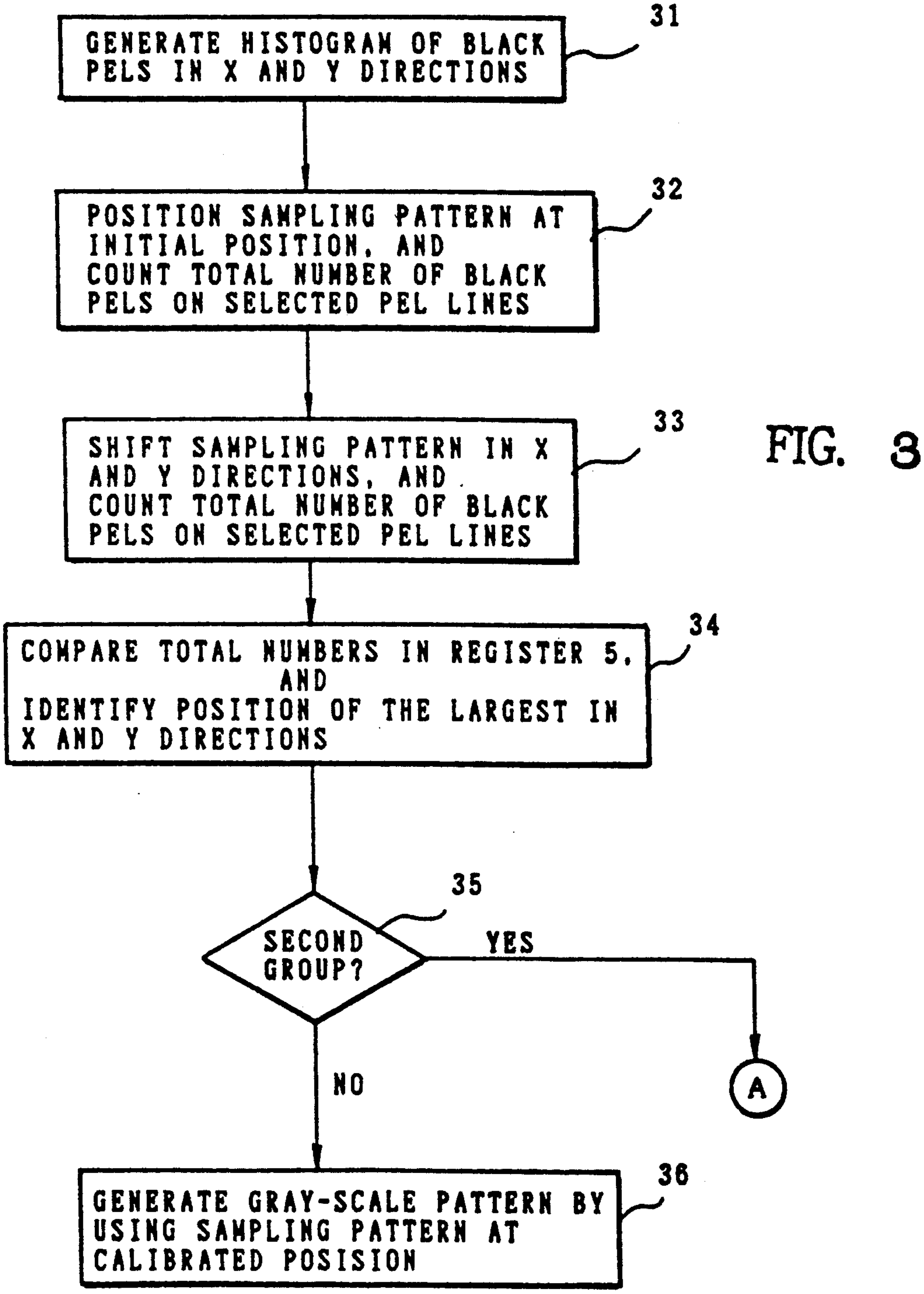
FIG. 3 is a flowchart of the operation for moving the entire sampling pattern in accordance with the present invention.

Microprocessor 3 performs the image converting operation shown in FIG. 3. In step 31 in FIG. 3, microprocessor 3 counts the number of black pels in each pel line in the X and Y directions of the original character image to generate a histogram 26 in the X direction and a histogram 27 in the Y direction, as shown in FIG. 2, and stores the histograms 26 and 27 in a histogram buffer memory 4 (FIG. 1).

The operation proceeds to step 32 of FIG. 3, in which microprocessor 3 positions the sampling pattern 21 at an initial position at which the upper left corner 22 of the sampling pattern is positioned at the upper left corner 23 of the dot matrix or character box of the original character image.

Figure 4A:
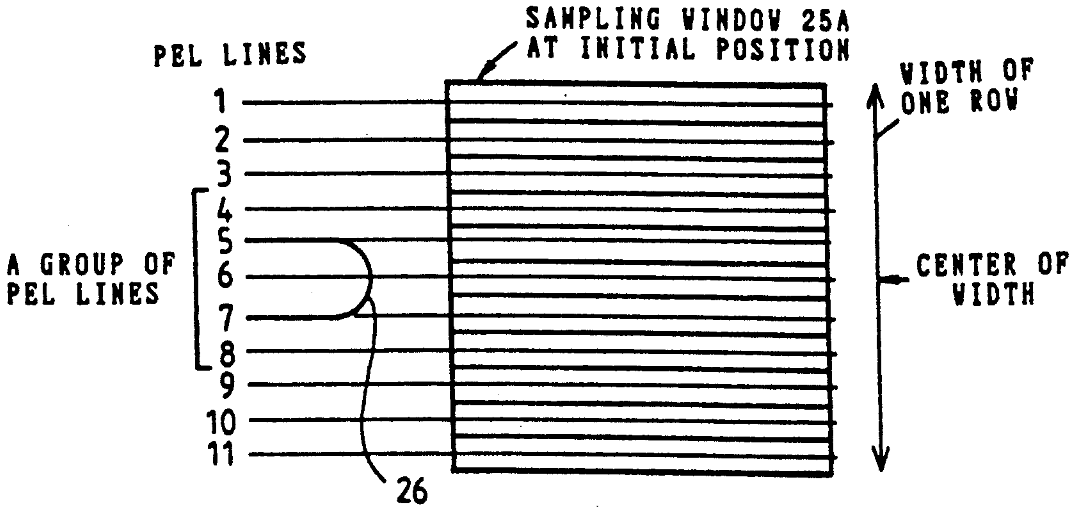
FIGS. 4A, 4B, 5A and 5B show the shifting of the sampling pattern in accordance with the present invention.

Describing the sampling operation in the row or X direction with reference to FIG. 4A, which is an enlargement of portion 24 of FIG. 2, pel lines 1-11 represent pel lines of the original character image. Microprocessor 3 selects a group of pel lines 4-8 for each row of the sampling pattern 21. Pel line 6 is positioned at the center of the width of a row, as shown in FIG. 4A. Microprocessor 3 counts the number of black pels in the group of pel lines 4-8 of the original character image for each of rows 1 through 8, by referring to the histogram 26 in the histogram buffer memory 4. Microprocessor 3 sums up the number of black pels in each row to generate the total number of horizontal black pels with the sampling pattern 21 at the initial position, and stores the total number in Y direction memory position 0 of register 5.

Figure 5A:
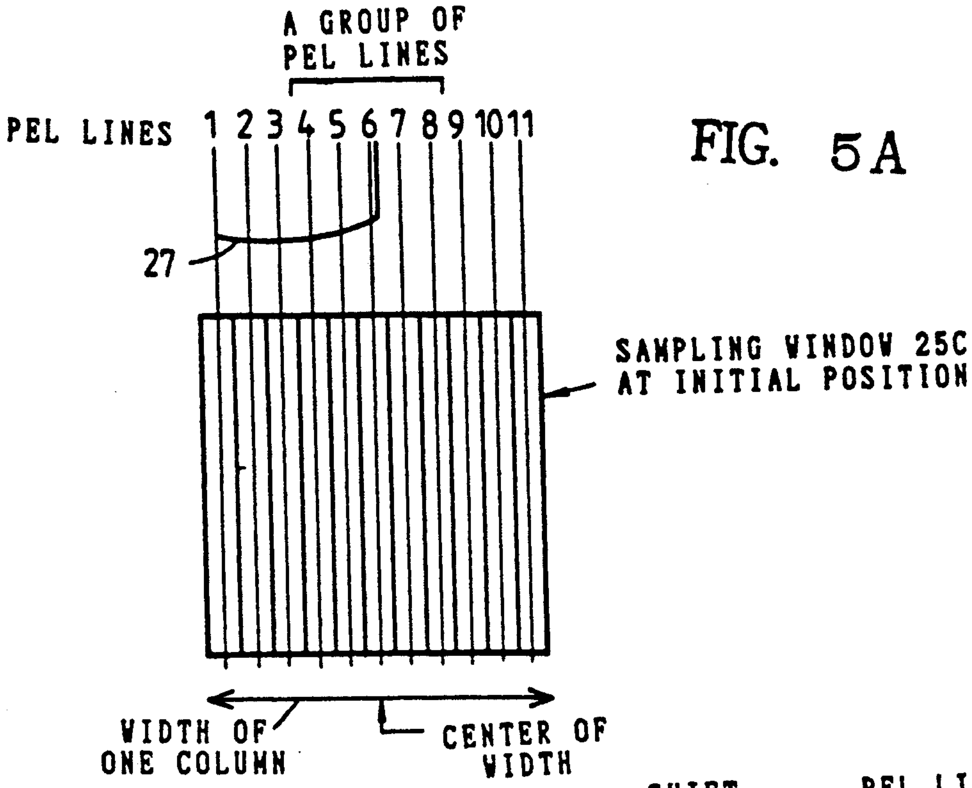

In the same manner, microprocessor 3 generates the total number of vertical black pels with the sampling pattern 21 at the initial position. More particularly, referring to FIG. 5A, which is an enlargement of portion 28 of FIG. 2, pel lines 1-11 represent the pel lines of the original character image. Microprocessor 3 selects a group of pel lines 4-8 for each column of the sampling pattern 21. Pel line 6 is positioned at the center of the width of a column, as shown in FIG. 5A. Microprocessor 3 counts the number of black pels in the group of pel lines 4-8 of the original character image for each of columns 1 through 8, by referring to the histogram 27 in the histogram buffer memory 4. Microprocessor 3 sums up the number of black pels in each column to generate the total number of vertical black pels with the sampling pattern 21 at the initial position, and stores the total number in X direction memory position 0 of register 5.

The operation proceeds to step 33 (FIG. 3), in which microprocessor 3 sequentially shifts the sampling pattern 21 from the initial position by ±1 pel line, ±2 pel lines and ±3 pel lines in the X and Y directions, and counts the total number of black pels for each position in the same manner as that described for the initial position.

Figure 4B:
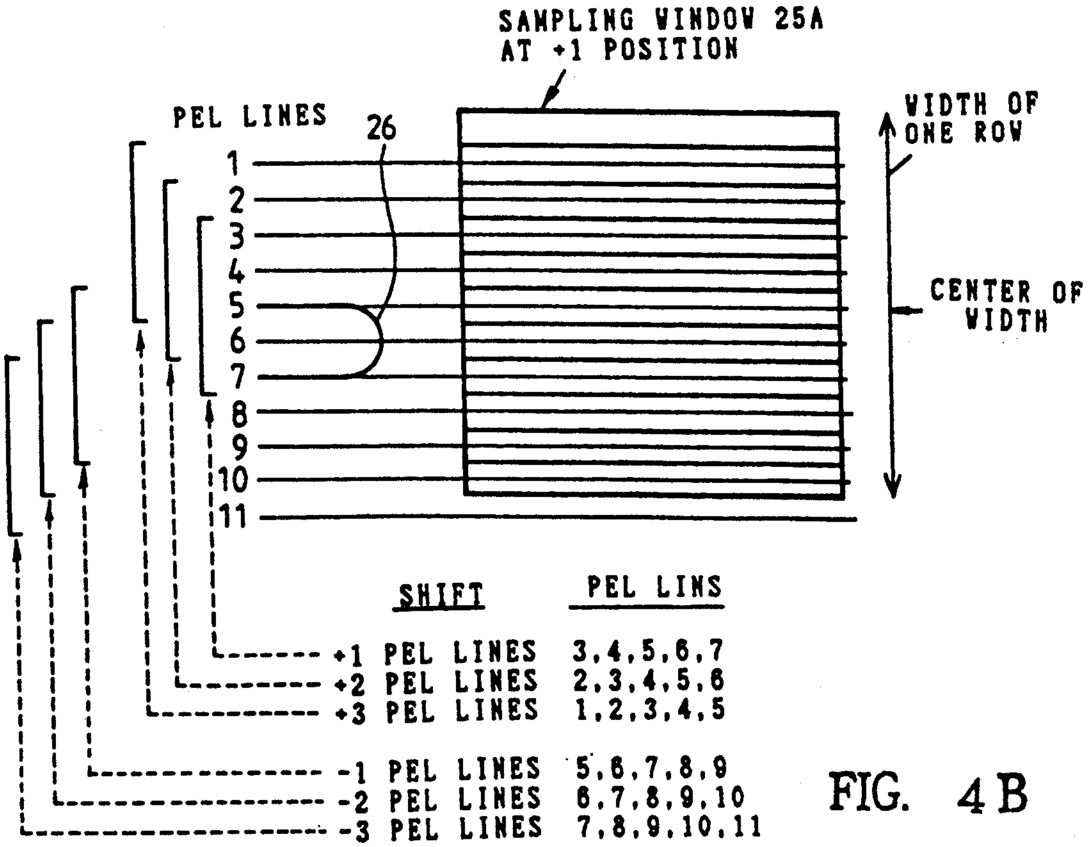

Describing the sampling operation in the row or horizontal direction with reference to FIG. 4B, the sampling pattern 21 is upwardly shifted by one pel line. The sampling window 25A in FIG. 4B shows the upward shift of the sampling pattern 21 by one pel line. Microprocessor 3 selects a group of pel lines 3-7 of the original character image for each row of the sampling pattern 21. Microprocessor 3 generates the total number of horizontal black pels of the sampling pattern 21 at the +1 position, and stores the total number in Y direction memory position +1 of register 5.

To shift the sampling pattern 21 to the +2, +3, −1, −2 and −3 positions, microprocessor 3 selects pel lines 2-6 for the +2 position, pel lines 1-5 for the +3 position, pel lines 5-9 for the −1 position, pel lines 6-10 for the −2 position, and pel lines 7-11 for the −3 position. Microprocessor 3 generates the total number of horizontal black pels of the sampling pattern 21 at each position, and stores them in the respective Y direction memory position of register 5.

Figure 5B:
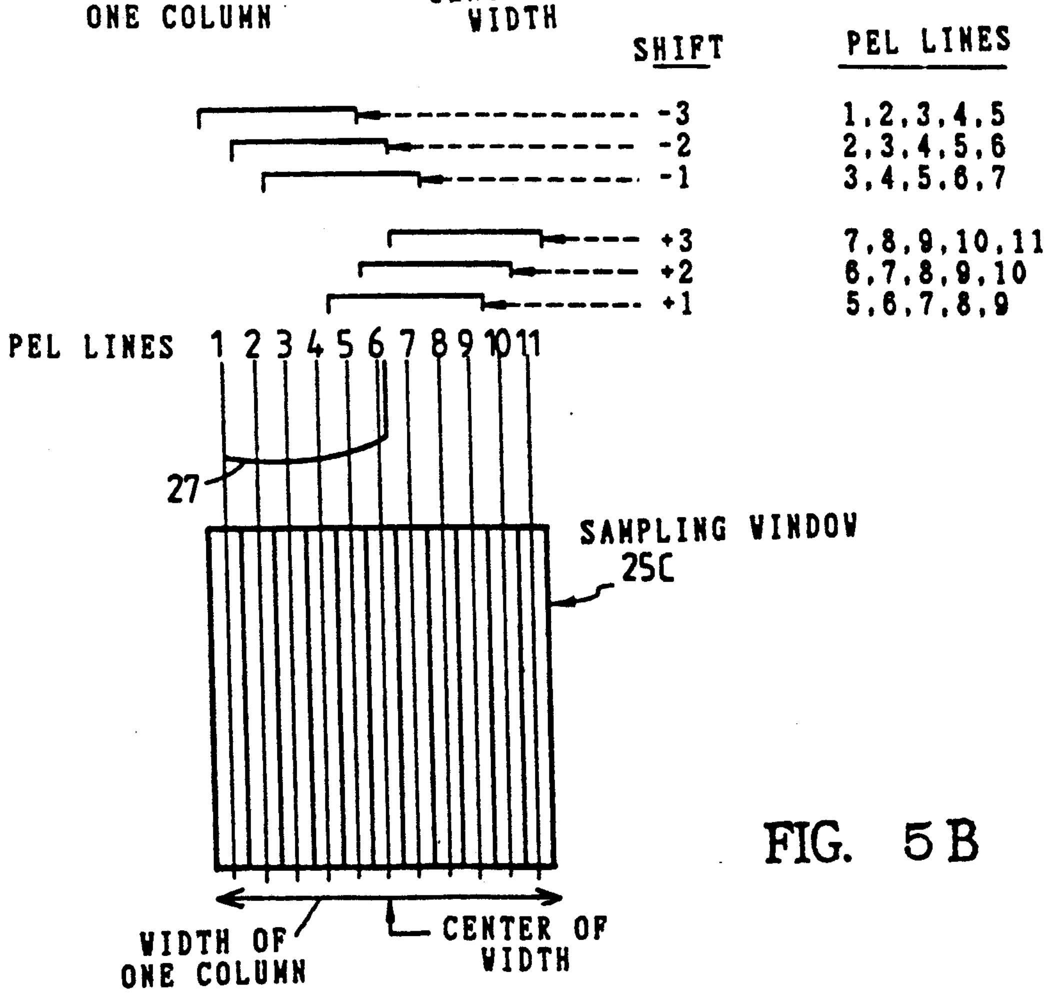

Next, microprocessor 3 sequentially shifts the sampling pattern 21 from the initial position by ±1, ±2 and ±3 pel lines in the X direction, as shown in FIG. 5B. To shift the sampling pattern 21 to the above positions, the microprocessor 3 selects pel lines 5–9 for the +1 position, pel lines 6–10 for the +2 position, pel lines 7–11 for the +3 position, pel lines 3–7 for the 1 position, pel lines 2–6 for the −2 position, and pel lines 1–5 for the −3 position. Microprocessor 3 generates the total number of vertical black pels of the sampling pattern 21 at each position, and stores them in the respective X direction memory position of register 5.

The total number of the black pels, Ts, at respective positions is represented by the following formula:

$$Ts = \sum_{i=1}^{t} \sum_{j=-w}^{w} f(P)$$

$$P = S + iB/t - B/2t + 1/2 + j$$

wherein:

P: Position of one pel line of the original character image f(P): The number of black pels on one pel line of the original character image w: The number of pel lines in one group on either side of the center portion of the row or column of the sampling pattern t: The number of dots or pels in the X or Y direction of the gray-scale pattern B: The number of dots or pels in the X or Y direction of the original character matrix or box S: The shift position.

The range of the shift position in the positive direction or the negative direction is represented by the following formula:

$$S<B/3t.$$

In the exemplary case, B=88 and t=8

$$S<3.67.$$

Thus, the +1, +2 and +3 shift positions are selected in the positive direction, and the −1, −2 and −3 shift positions are selected in the negative direction. Next, the microprocessor 3, in step 34 (FIG. 3), compares the total number stored in each of the Y direction memory positions +3, +2, +1, 0, −1, −2 and −3 of register 5, identifies one position at which the largest value is stored, and selects the identified position as a calibrated position of the sampling pattern 21 in the Y direction. It is assumed that the distance between the initial position and the calibrated position of the sampling pattern in the Y direction is Sy, as shown in FIG. 6.

Microprocessor 3 also compares the total number stored in each of the X direction memory positions +3, +2, +1, 0, −1, −2 and −3 of register 5, identifies one position at which the largest value is stored, and selects the identified position as a calibrated position of the sampling pattern 21 in the X direction. It is assumed that the distance between the initial position and the calibrated position of the sampling pattern 21 in the X direction is Sx, as shown in FIG. 6.

Figure 6:
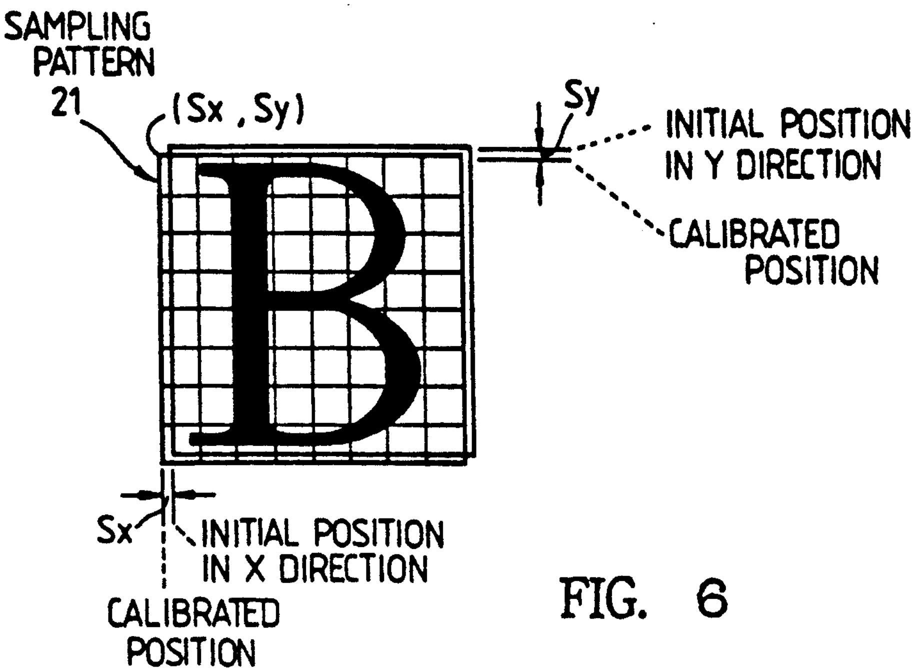
FIG. 6 shows the initial position and the calibrated position of the sampling pattern in accordance with the present invention.
Figure 7:
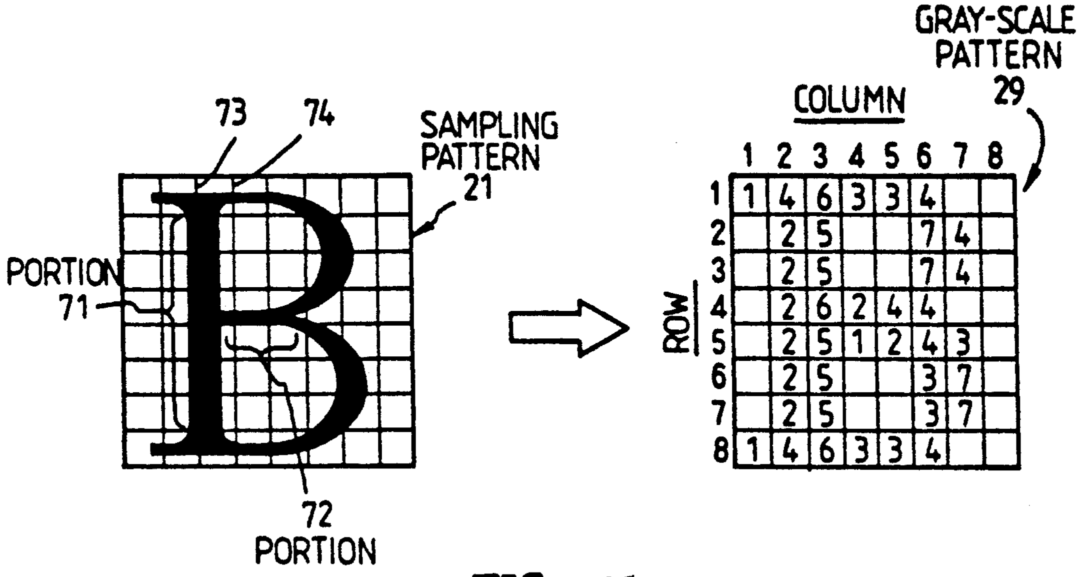
FIG. 7 shows the position of the sampling pattern and the gray-scale pattern obtained in the prior art.

FIG. 7 shows a gray-scale pattern 29 generated as in the prior art using the sampling pattern 21 positioned at the initial position shown in FIG. 6 without the calibrating operation.

Figure 8:
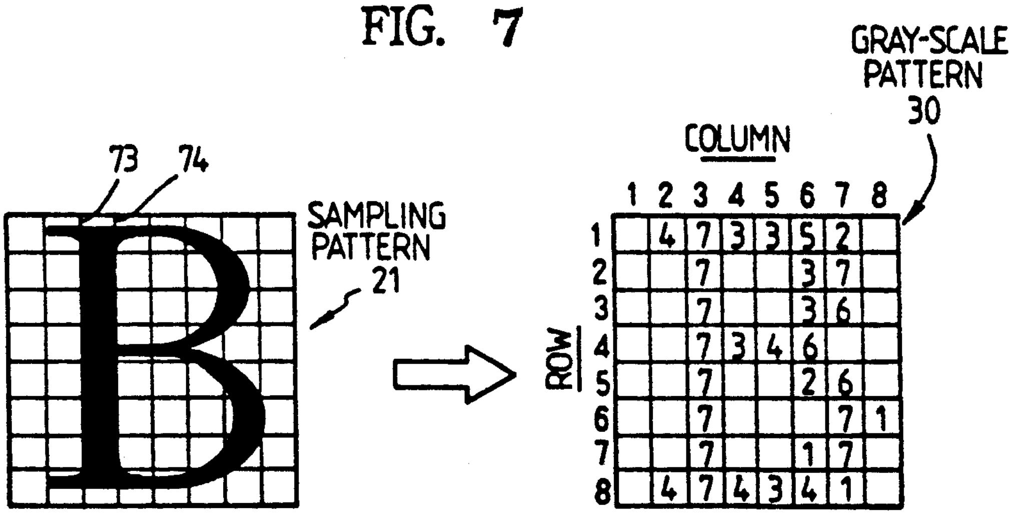
FIG. 8 shows the sampling pattern positioned at the calibrated position and the gray-scale pattern obtained in accordance with the present invention.

FIG. 8 shows a gray-scale pattern 30 generated by using the sampling pattern 21 positioned at the calibrated position Sx, Sy shown in FIG. 6 in accordance with the present invention.

Comparing gray-scale pattern 29 with gray-level pattern 30 by observing two portions 71 and 72 of the character B, portion 71 is represented in gray-scale pattern 29 by gray-scale value 2 in column 2 and by gray-scale values 5 and 6 in column 3, while in gray-scale pattern 30 portion 71 is represented by gray-scale value 7 in the column 3. Portion 72 is represented in gray-scale pattern 29 by gray-scale values 2 and 1 in column 4 and by gray-scale values 4 and 2 in column 5, while in gray-scale pattern 30 portion 71 is represented by gray-scale values 3 and 4 in row 4. It is apparent that the gray-scale pattern 30 generated in accordance with the present invention is of excellent readability in comparison with the gray-scale pattern 29 generated in accordance with the prior art.

The purpose of the operations shown in FIG. 3 is to entirely shift or move the sampling pattern 21 on the original character image of high resolution. In the entire shift of the sampling pattern 21, the border lines of the sampling windows which pass, at the initial position, within the black lines of the character are shifted so as to position the major portion of the black line(s) of the character between the border lines of the sampling windows. Referring to FIGS. 7 and 8, a border line 73 passes within portion 71 which is the vertical line of the character B before the entire shift of the sampling pattern 21, as shown in FIG. 7, whereby portion 71 is of inferior readability, as shown by the gray-scale pattern 29. After the entire shift of the sampling pattern 21 in accordance with the present invention, portion 71 of the character B is positioned between border lines 73 and 74 of the sampling pattern 21, as shown in FIG. 8, so that portion 71 is of excellent readability, as shown by the gray-scale pattern 30.

In the steps shown in FIG. 3, the position of the entire sampling pattern is shifted on the original character image to detect an optimum or calibrated position in the X and/or Y direction at which the total number of black pels on a group of pel lines at the center portion of each of all rows and/or all columns is the largest value.

The characters are roughly categorized into a first group of characters, e.g. alphanumeric characters, including few horizontal and vertical lines and a second group of characters, e.g. Japanese kanji characters, including many horizontal and vertical lines.

The entire shift of the sampling pattern 21 performed by the operations in steps 31–34 (FIG. 3) improves the readability of the first group of characters. The readability of characters such as kanji characters belonging to the second group is further improved by the next operation described with reference to FIGS. 9–13, in addition to the operations in steps 31–34.

To this end, step 35 (FIG. 3) determines whether or not the character being processed is a character such as a kanji character belonging to the second group. In the case of the alphanumeric character B described hereinbefore, the answer in step 35 is no, and the operation proceeds to step 36, in which microprocessor 3 positions the sampling pattern 21 at the calibrated position Sx, Sy on the original character pattern, as shown in FIG. 6, counts the number of black pels surrounded by each sampling window of the sampling pattern 21, and assigns one of the different gray-scale levels or values 0–7 to the number of black pels of each sampling window, whereby the gray-scale pattern 30 shown in FIG. 8 representing the original character B is generated. Gray-scale pattern 30 is stored in buffer memory 6

(FIG. 1), and is supplied to the display apparatus or printer.

The operation shown in FIGS. 9-13 shifts the position of particularly selected row(s) and/or column(s) in the sampling pattern 21 positioned at the calibrated position Sx, Sy, shown in FIG. 6.

Figure 10:
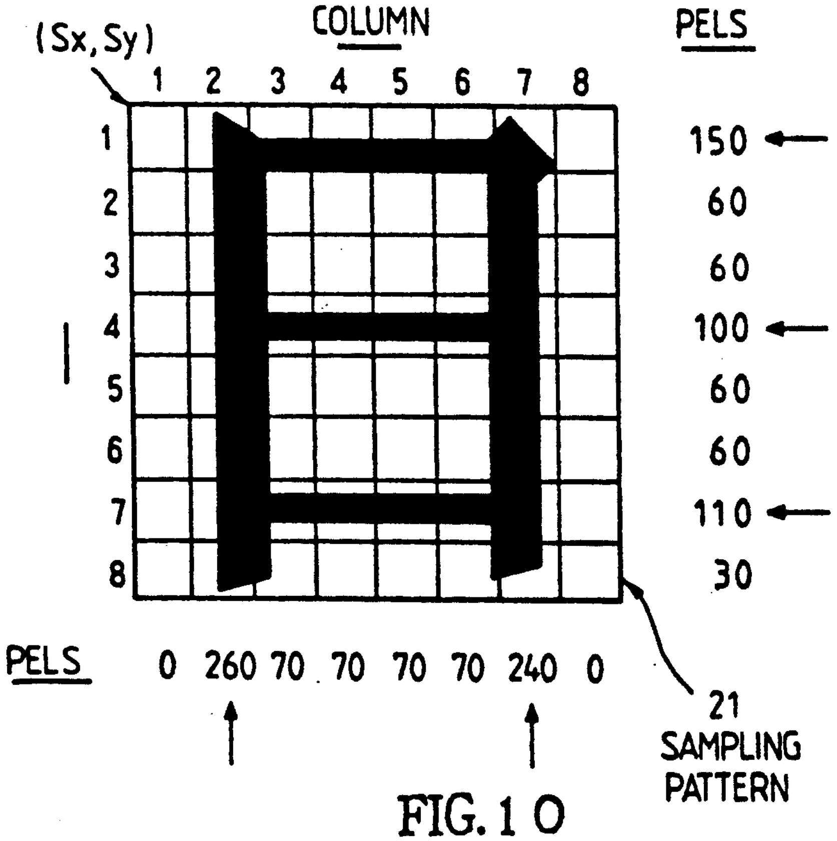
FIGS. 10 and 11 show the operation for selectively moving the particularly row or column of the sampling pattern in accordance with the present invention.

It is assumed that the entire shift of the sampling pattern 21 for a kanji character, as shown in FIG. 10 has been completed by the operations of steps 31-34 (FIG. 3), and that the sampling pattern 21 in FIG. 10 has been positioned at the calibrated position Sx, Sy. In this case, the answer in step 35 (FIG. 3) is yes, and the operation proceeds to step 91 (FIG. 9), in which microprocessor 3 selects the calibrated position Sx, Sy of the sampling pattern 21, shown in FIG. 6.

The operation proceeds to step 92, in which microprocessor 3 selects the group of pel lines passing through the center portion of each row and column of the sampling pattern 21, and counts the number of black pels on the five pel lines for each row and column of the sampling pattern 21 at the calibrated position Sx, Sy. The number of black pels detected in each row and column is shown in FIG. 10. Next, microprocessor 3 compares the number of black pels in row N with the number of black pels in row N−1 and with the number of black pels in row N+1, and compares the number of black pels in column N with the number of black pels in colum N−1 and with the number of black pels in column N+1, to detect the column or row having the number of black pels larger than that of the adjacent ones.

It is assumed that the number of black pels outside the sampling pattern 21 is zero. In the exemplary case shown in FIG. 10, microprocessor 3 detects rows 1, 4 and 7 and columns 2 and 7, as shown by arrows in FIG. 10. Row 1 has a value 150, i.e. the number of black pels, which is larger than the value zero of an upper adjacent row outside the sampling pattern 21 and the value 60 in row 2. Row 4 has a value 100 which is larger than the value 60 in row 3 and the value 60 in row 5. Row 7 has a value 110 which is larger than the value 60 in row 6 and the value 30 in row 8. Column 2 has a value 260 which is larger than the value 0 in column 1 and the value 70 in column 3. And, column 7 has a value 240 which is larger than the value 70 in column 6 and the value 0 in column 8. Therefore, microprocessor 3 selects columns 2 and 7 and rows 1, 4 and 7 as candidate rows and columns to be shifted.

Figure 9:
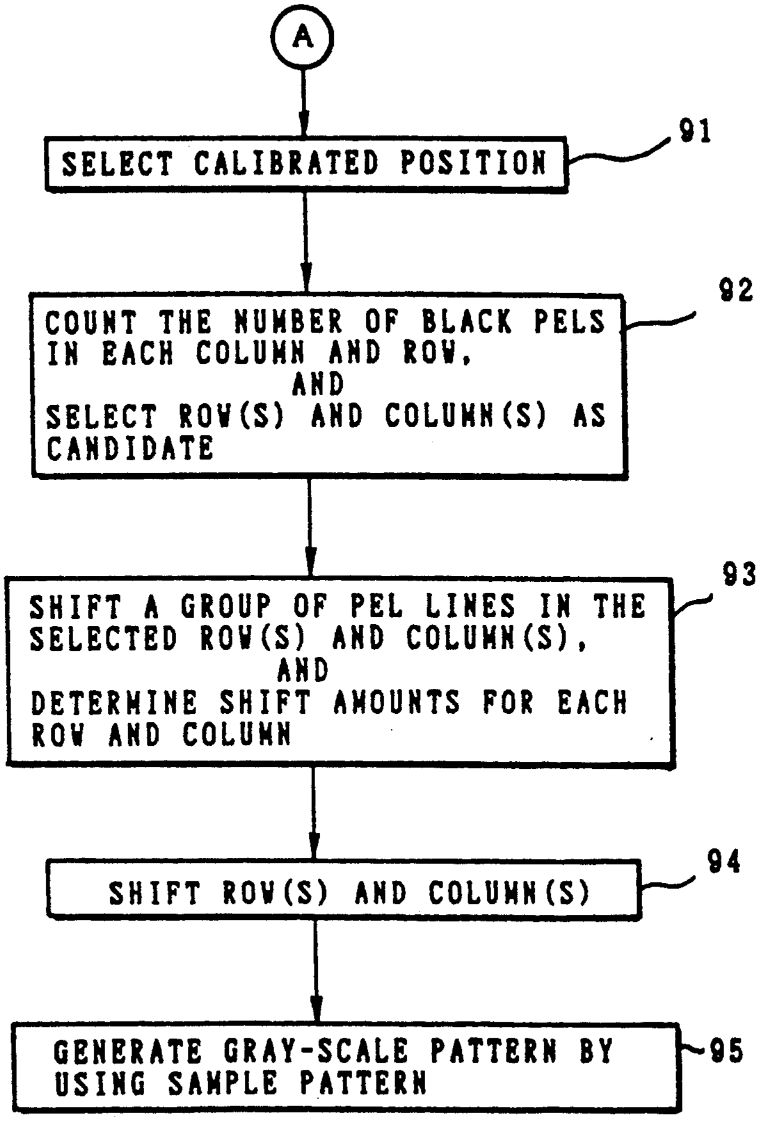
FIG. 9 is a flowchart of the operation for moving the particularly selected row or column of the sampling pattern in accordance with the present invention.
Figure 11:
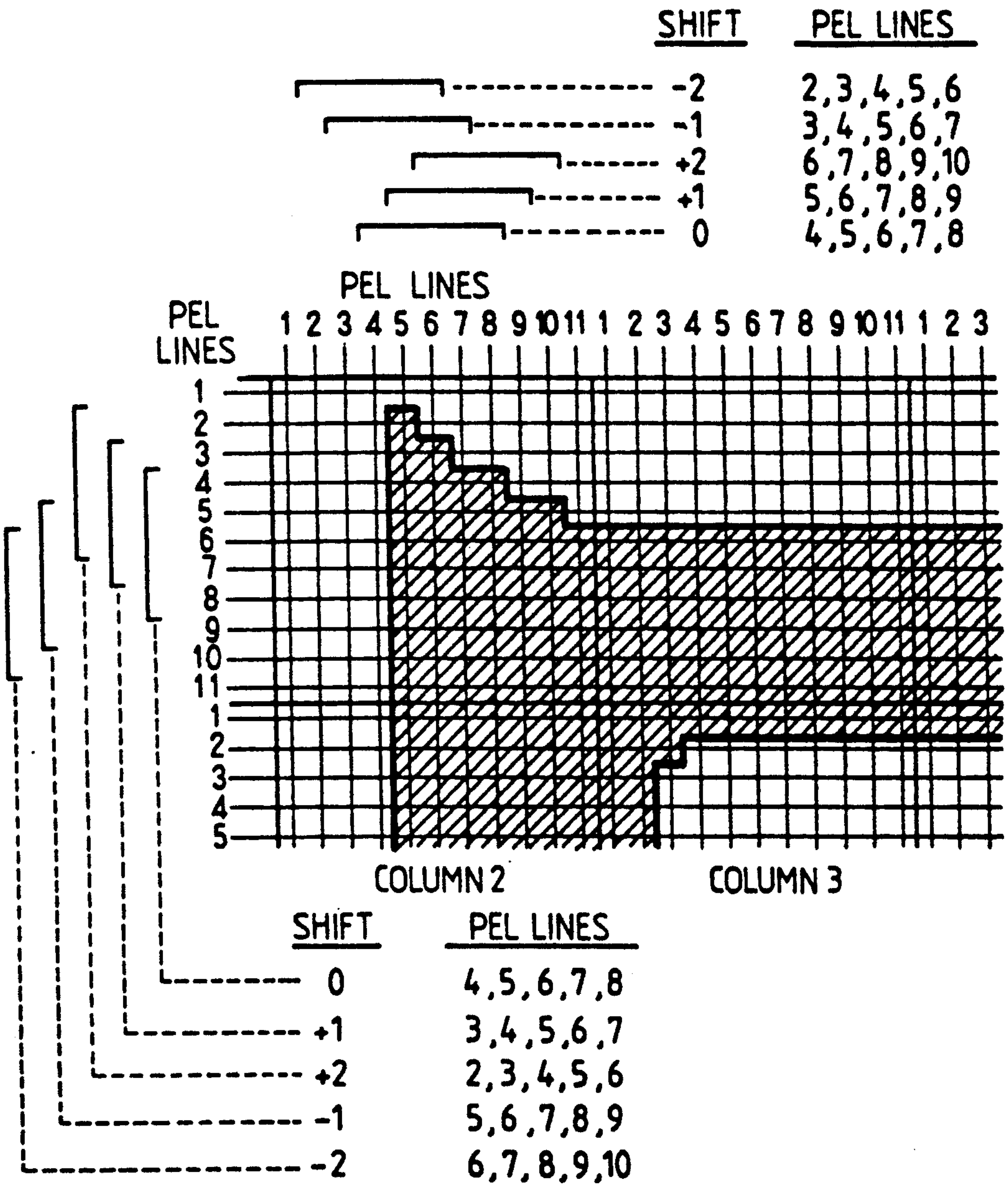

The operation proceeds to step 93 in FIG. 9, in which microprocessor 3 shifts the position of rows 1, 4 and 7 and columns 2 and 7 selected in block 92. Microprocessor 3 performs the shift operation by shifting the position of the five pel lines on the original character image from the position 0 passing through the center of the column or row to the +1, +2, −1 and −2 positions, and counts the number of black pels on the five pel lines at each shift position. FIG. 11 shows the sampling windows at columns 2 and 3 in row 1 of the sampling pattern 21 shown in FIG. 10. Referring to column 2 in FIG. 11, a group of pel lines, i.e. the five pel lines, is initially located at the position 0 and shifted to the positions +1, +2, −1 and −2, and the number of black pels on the five pel lines in each of the positions +2, +1, 0, −1, −2 is counted, and stored in register 7 (FIG. 1). It is apparent from FIG. 11 that the maximum values for column 2 are obtained in the shift positions +1 and +2. From the positions +1 and +2 generating the maximum values, the position +1 nearest to the original position 0 is selected, and stored in the register 7. The same operation as above is performed in column 7, and microprocessor 3 determines that shift position −2 generates the maximum value and stores column 7 and position −2 in the register 7. The process for row 1 is described with referring to FIG. 11, again. It is apparent in FIG. 11 that shift position −2 generates the maximum value for row 1. Position −2 for row 1 is stored in register 7.

In the same manner as that described above, microprocessor 3 determines the maximum value at positions 0 and −1 for row 4, and determines the maximum value at shift positions −1, 0 and +1 for row 7. The original position 0 is selected when the original position 0 generates the maximum value, so that microprocessor 3 stores position 0 in the memory positions labelled "SHIFT" for rows 4 and 7 of register 7, as shown in FIG. 1.

In this manner, microprocessor 3 shifts a group of pel lines within the row or column of the sampling pattern 21 which is selected in step 92, and counts the number of black pels in each position to determine the shift amounts of the row or column.

It is noted that the shift amounts 0 in rows 4 and 7 represent that these rows 4 and 7 are not shifted.

Figure 12:
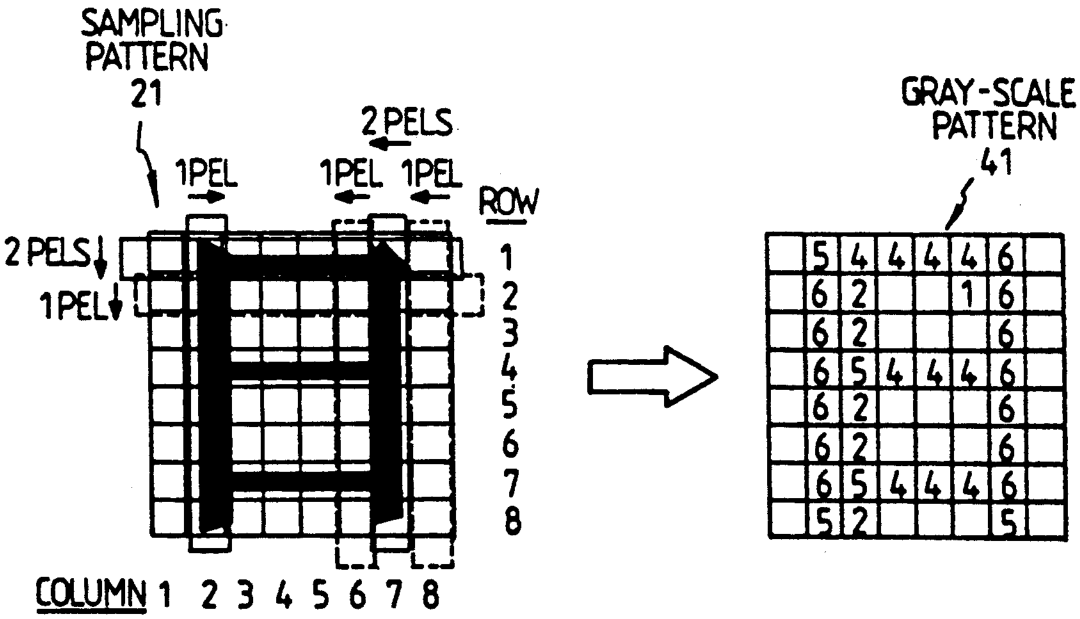
Figure 14:
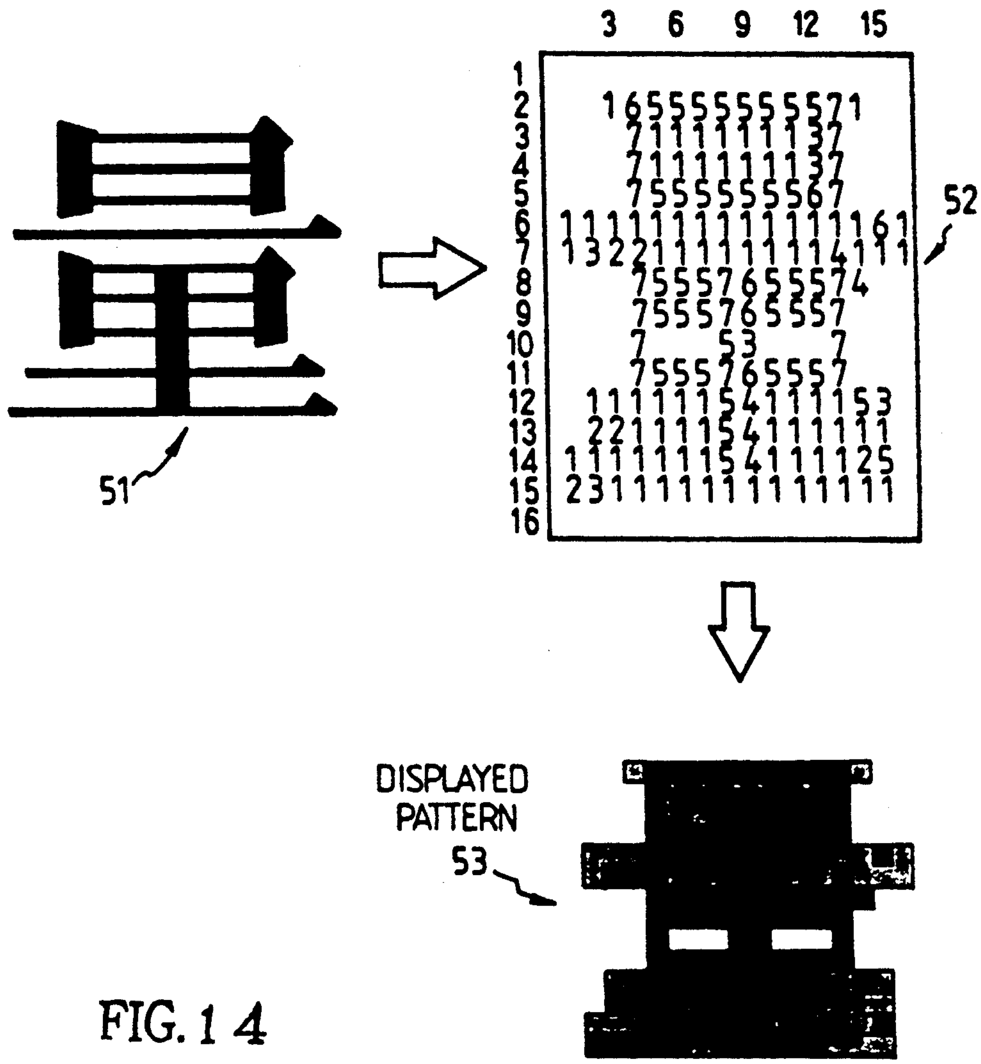
FIG. 14 shows the kanji character pattern and the gray-scale pattern in the prior art.

The operation proceeds to step 94, wherein microprocessor 3 shifts row 1, column 2 and column 7 in accordance with the shift values in register 7 (FIG. 1). More particularly, microprocessor 3 shifts row 1 of the sampling pattern 21 by two pel lines in the downward direction, and shifts the adjacent row 2 by one pel line in the downward direction, as shown in FIG. 12. Microprocessor 3 shifts column 2 by one pel line in the rightward direction, as shown in FIG. 12. Microprocessor 3 shifts column 7 by two pel lines in the leftward direction, and shifts the adjacent columns 6 and 8 in the leftward direction, as shown in FIG. 12. The purpose of shifting the adjacent row or column in the same direction is to reduce distortion of the character image.

The operation proceeds to step 95 in FIG. 9, wherein microprocessor 3 positions the sampling pattern 21 at the calibrated position Sx, Sy on the original character image, detected in step 34 (FIG. 3), shifts the rows and column of the sampling pattern 21 as shown in FIG. 12, counts the number of black pels surrounded by each sampling window, and assigns a gray-scale level or value 0-7 to the number of black pels of each sampling window, whereby the gray-scale pattern 41 representing the original kanji character image is generated, as shown in FIG. 12. Gray-scale pattern 41 is stored in buffer memory 6 (FIG. 1) and is supplied to the display apparatus or printer.

Figure 13:
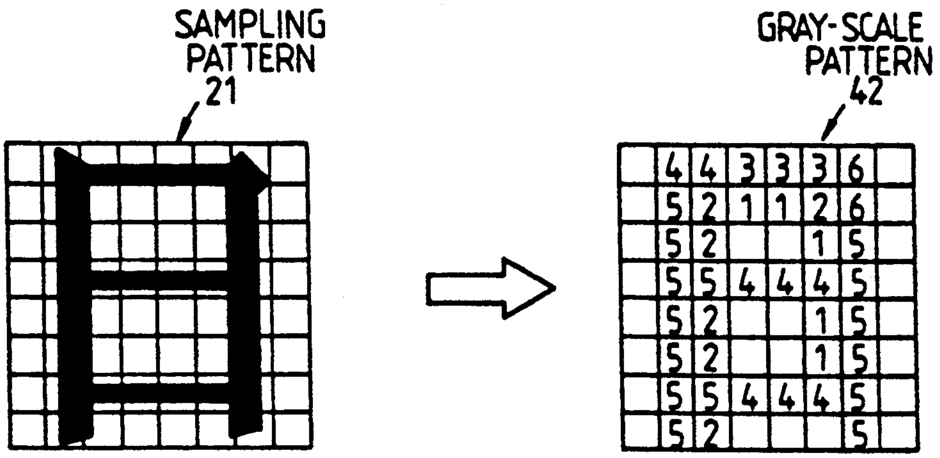
FIGS. 12 and 13 show the kanji character pattern and the gray-scale pattern in accordance with the present invention.

FIG. 13 shows the gray-scale pattern 42 which is generated by using the sampling pattern 21 which is positioned at the calibrated position Sx, Sy detected in step 34 in FIG. 3, without the shift of the particular rows and columns shown in FIG. 12.

Comparing the gray-scale pattern 41 with the gray-scale pattern 42, it is apparent that the readability of the uppermost horizontal line, the left vertical line and the right vertical line of the kanji character is remarkably improved.

In the operation shown in FIG. 9, the position of each selected row or column of the sampling pattern at the calibrated position is shifted to the position at which the number of black pels in the selected row or column is the largest value.

The invention thus improves the poor quality or inferior readability of the gray-scale pattern generated from the high-resolution original character image.

What is claimed is:

1. A method for generating a low-resolution gray-scale pattern representing a high-resolution original character image, said original character image comprising a two-dimensional array of foreground and background pels arranged in rows and columns, said method comprising the steps of:

generating a sampling pattern having plural sampling windows arranged in columns and rows, the number of columns and rows of the sampling pattern being determined by the resolution of said gray-scale pattern, each window of the sampling pattern overlying a matrix of pels of the original character image;

sequentially positioning said sampling pattern at plural positions separated by a predetermined distance along a column direction on said original character image to count, at each position, the total number of foreground pels of the original character image in predetermined portions of the rows of said sampling pattern;

comparing the total number of foreground pels counted in each of said positions to detect a position at which the largest number of foreground pels is detected;

positioning said sampling pattern at said detected position on said original character image; and counting the number of foreground pels in each sampling window of said sampling pattern to assign a gray-scale value to the sampling window in accordance with the number of foreground pels counted.

2. A method according to claim 1, wherein a group of rows of the original character image passing through a center portion of a corresponding sampling window is used to count the number of foreground pels in each row of the sampling pattern.

3. A method according to claim 1, wherein said sampling pattern is sequentially positioned at plural positions separated by one pel row of the original character image.

4. A method for generating a low-resolution gray-scale pattern representing a high-resolution original character image, said original character image comprising a two-dimensional array of foreground and background pels arranged in rows and columns, said method comprising the steps of:

generating a sampling pattern having plural sampling windows arranged in columns and rows, the number of columns and rows of the sampling pattern being determined by the resolution of said gray-scale pattern, each window of the sampling pattern overlying a matrix of pels of the original character image;

sequentially positioning said sampling pattern at plural positions separated by a predetermined distance along a column direction and a row direction on said original character image to count, at each position, the total number of foreground pels in predetermined portions of the rows of said sampling pattern and the total number of foreground pels in predetermined portions of the columns of said sampling pattern;

comparing the total number of foreground pels counted at each of said positions to detect a position at which the largest total number of foreground pels in said column portions is detected and at which the largest total number of foreground pels in said row portions is detected;

positioning said sampling window at said detected position on said original character image; and counting the number of foreground pels in each sampling window of said sampling pattern to assign a gray-scale value to the sampling window in accordance with the number of foreground pels counted.

5. A method according to claim 4, wherein respective groups of rows and columns of the original character image passing through a center portion of a corresponding sampling window are used to count the number of foreground pels in each row and column of the sampling window.

6. A method according to claim 4, wherein said sampling pattern is sequentially positioned at plural positions separated by one pel row or column of the original character image.

7. A method for generating a low-resolution gray-scale pattern representing a high-resolution original character image, said original character image comprising a two-dimensional array of foreground and background pels arranged in rows and columns, said method comprising the steps of:

generating a sampling pattern having plural sampling windows arranged in columns and rows, the number of columns and rows of the sampling pattern being determined by the resolution of said gray scale pattern, each window of the sampling pattern overlying a matrix of pels of the original character image;

sequentially positioning said sampling pattern at plural positions separated by a predetermined distance along a column direction and a row direction on said original character image to count, at each position, the total number of foreground pels in predetermined portions of the rows of said sampling pattern and the total number of foreground pels in predetermined portions of the columns of said sampling pattern;

comparing the total number of foreground pels counted at each of said positions to detect a position at which the largest total number of foreground pels in said column portions is detected and at which the largest total number of foreground pels in said row portions is detected;

positioning said sampling window at said detected position on said original character image;

counting the number of foreground pels in each row and column of said sampling pattern;

comparing the number of foreground pels in each row to select a row having a larger number of foreground pels than adjacent rows and comparing the number of foreground pels in each column to select a column having a larger number of foreground pels than adjacent columns;

sequentially positioning said selected row and column at plural positions separated by a predetermined distance along said column direction and said row direction, respectively, on said original character image to count the number of foreground pels in said row and the number of foreground pels in said column at each position;

comparing the number of foreground pels in said selected row at each position to detect a position in a column direction at which the largest number of foreground pels is detected and comparing the number of foreground pels in said selected column at each position to detect a position in a row direction at which the largest number of foreground pels is detected;

shifting the positions of said selected row and column to said detected positions; and counting the number of foreground pels in each sampling window of said sampling pattern to assign a gray-scale value to the sampling window in accordance with the number of foreground pels counted.

8. A method according to claim 7, wherein respective groups of rows and columns of the original character image passing a center portion of a corresponding sampling window are used to count the number of pels in each row and column of the sampling window.

9. A method according to claim 7, wherein said sampling pattern is sequentially positioned at plural positions separated by one pel row or column of the original character image.

* * * * *